United States Patent [19]

Kuusik

[11] 4,082,103

[45] Apr. 4, 1978

[54] CENTRIFUGAL FORCE HYDRAULIC GOVERNOR

[75] Inventor: Uno Kuusik, Royal Oak, Mich.

[73] Assignee: Chrysler Corporation, Highland Park, Mich.

[21] Appl. No.: 722,171

[22] Filed: Sep. 24, 1976

[51] Int. Cl.² .......................................... G05D 13/36
[52] U.S. Cl. ........................................ 137/54; 137/58
[58] Field of Search .................................. 137/54, 58

[56] References Cited

U.S. PATENT DOCUMENTS

| | | | |
|---|---|---|---|
| 3,151,622 | 10/1964 | Hause | 137/54 |
| 3,265,081 | 8/1966 | Stockton | 137/54 |
| 3,266,506 | 8/1966 | Takahashi | 137/54 |
| 3,413,991 | 12/1968 | Lewicki | 137/54 |
| 3,791,458 | 2/1974 | Wallace | 137/58 X |

Primary Examiner—Robert G. Nilson
Attorney, Agent, or Firm—Baldwin & Newtson

[57] ABSTRACT

Hydraulic governor having two centrifugal force controlled valves connected to a transmission output shaft. A relay valve is attached to the transmission case and connected hydraulically to the governor. Line pressure fluid supplied to the relay valve is modified to a value relating to the speed of rotation of the output shaft by the centrifugal force controlled valves in the governor.

6 Claims, 3 Drawing Figures

CENTRIFUGAL FORCE HYDRAULIC GOVERNOR

BACKGROUND OF THE INVENTION

This invention relates to centrifugal force operated hydraulic governors, and more particularly to a hydraulic governor which may be mounted on one side of a rotatable member and which also provides a two stage governor pressure-speed curve.

Hydraulic governors used in automatic transmission usually include a valve member which is reciprocable radially in a bore for controlling the passage of fluid from a pressure source in the transmission to a lower pressure operated device, such as a valve. These governors normally include a stem or rod extending from the movable valve through a hole extending diametrically through a shaft, such as the transmission output shaft. One or more weights are connected to the other end of the stem or rod on the opposite side of the output shaft. These weights aid in controlling the governor pressure-speed curve characteristics of the governor. Since a hole is made diametrically through the output shaft of the transmission, stress concentrations which are not advantageous may be formed in the shaft. In order to avoid the stress concentrations in the shaft, one-sided governors, i.e., governors adapted to be mounted on one side only of an output shaft, have been developed, and the present invention relates to such a governor.

The governors are of a non-linear-type in which the governor pressure is a function of the square of the revolutions per minute of the transmission output shaft. The governor pressure-speed curve of such governors is parabolic. Normally, the curve is improved by bottoming out governor weights at one or more midspeed points to piece together two or more parabolic curves, thereby lowering the slope of the total curve and providing a more proportional governor pressure-speed relationship.

BRIEF SUMMARY OF THE INVENTION

Briefly, this invention comprises a body adapted to be mounted on one side of a rotatable member, the body having two valves therein for opening and closing at different times under the influence of centrifugal force to produce a hydraulic pressure related to the speed of rotation of the member, and a relay valve for relaying such pressure to an outlet.

One of the primary objects of this invention is to provide a hydraulic governor having one speed responsive control portion adapted to be mounted on one side of a rotatable member, such as a transmission output shaft, thereby avoiding stress concentrations in the output shaft.

Another object of the present invention is to provide a hydraulic governor of the type described which includes a relay valve having an input pressure of one value and a speed responsive governor pressure on the output side thereof.

A further object of the invention is to provide a hydraulic governor such as described, having a speed responsive control portion which may be readily attached to a carrier or support mounted on the rotatable shaft.

Still a further object of this invention is to provide a hydraulic governor of the class described which is simple and economical in construction and effective in operation.

Other objects and advantages of the invention will be made apparent as the description progresses.

BRIEF DESCRIPTION OF THE DRAWINGS

In the accompanying drawings, in which one of various possible embodiment is disclosed.

Like parts are shown by corresponding reference characteristics throughout the several views of the drawings.

DESCRIPTION OF THE PREFERRED EMBODIMENT

Figure 1:
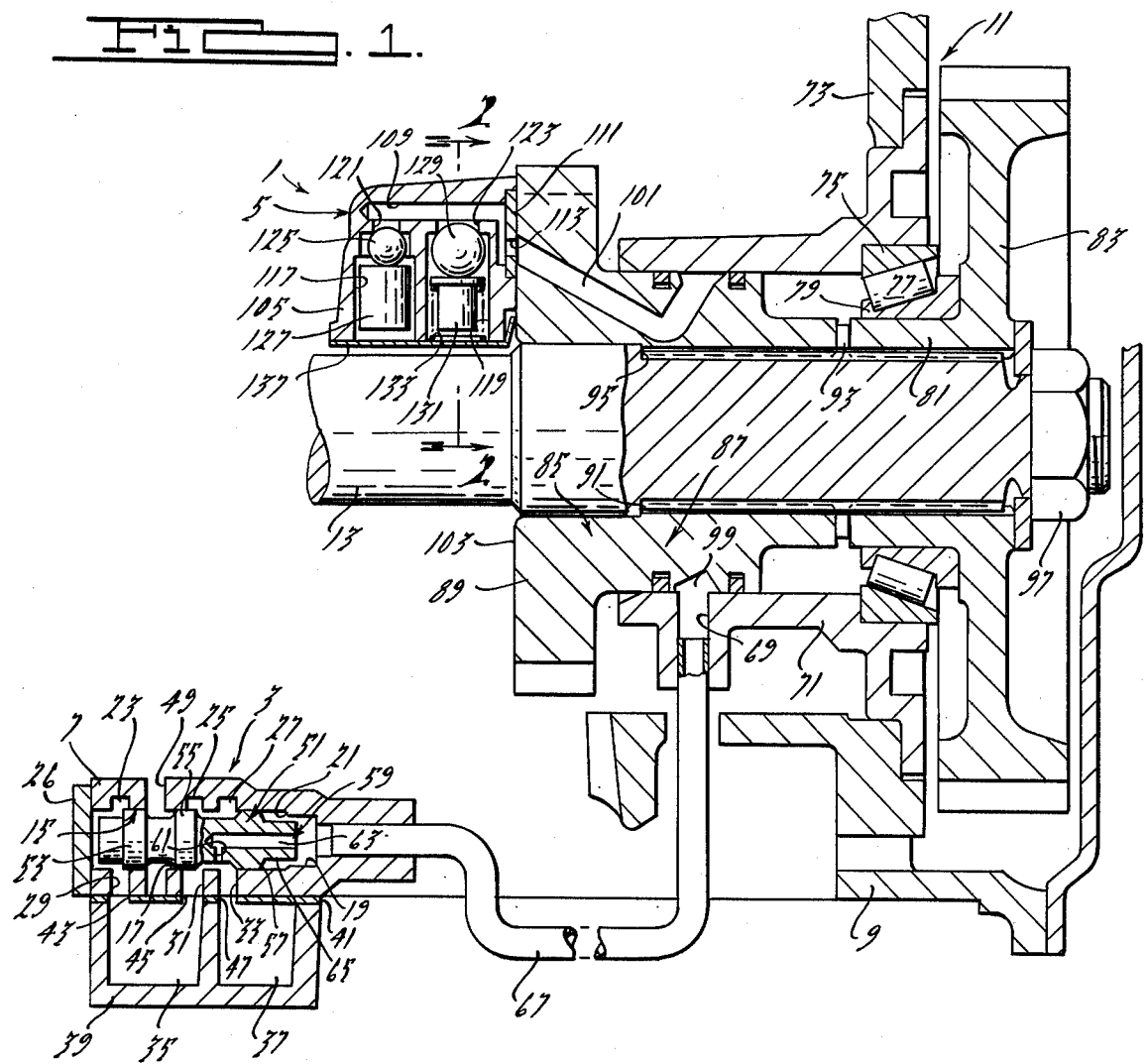
FIG. 1 is a side elevation, parts being removed and shown in sections for clarity, of a governor constructed in accordance with this invention, the governor being mounted on a transfer shaft of an automatic transmission.
Figure 2:
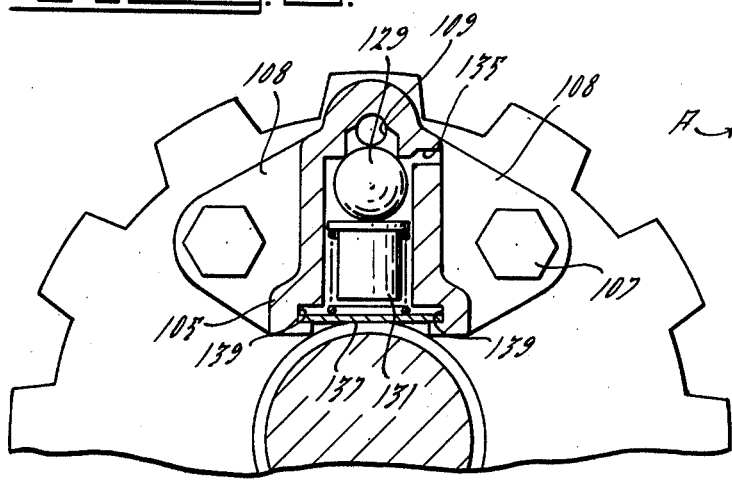
FIG. 2 is a section taken along line 2—2 of FIG. 1.

Referring now to the drawings, hydraulic governor apparatus of this invention is generally indicated at 1 and includes a relay valve assembly 3 and a speed responsive device 5. Relay valve assembly 3 is part of a valve body 7 mounted on the housing 9 of the transmission 11, while speed responsive device 5 is connected to a shaft 13 driven by the transmission.

More specifically, the valve body 7 of relay valve assembly 3 includes a stepped bore 15 having an enlarged portion 17 and a reduced diameter portion 19 separated by an annular shoulder 21. Annular grooves 23, 25, 27 are formed in bore portion 17 and are spaced from one another as indicated in FIG. 1. Ports 29, 31 and 33 connect the grooves 23, 25 and 27 with a governor pressure passage 35 and a line pressure passage 37 formed in a transfer plate 39. A valve body plate 41 having suitable openings 43, 45 and 47 is interposed between the transfer plate and the valve body. A vent 49 is also provided to bore 17 between grooves 23 and 25. A valve member 51 having lands or shoulders 53, 55 and 57 is slideably mounted in the bore portion 19. The location of shoulder 21 is such that insertion of the valve member cannot be installed improperly, i.e., should the valve member be inserted with the land 53 to the right as viewed in FIG. 1, the end of the valve member will extend outwardly beyond the left end of the bore 15, thus preventing the attachment of a cover 26.

Groove 27 may be referred to as a line pressure output groove, while groove 25 is a metering groove and groove 23 is a governor pressure groove. Groove 25 is in communication with the valve outlet. Lands 53 and 55 normally straddle vent 49 and lands 55 and 57 straddle line pressure groove 27 and a portion of metering groove 25. The valve member 51 has an internal passage 59 connecting the periphery of the valve member between lands 25 and 27 with the end of the valve member beyond land 57, the passage 59 including a restricted orifice 61 and a portion 63 extending through an extension 65. When the end of extension 65 is seated on shoulder 21, port 31 is in communication with vent 49 and communication between ports 31 and 33 is blocked.

The right-hand end of bore 15 is connected by a line 67 to a port 69 in a bearing sleeve 71 secured in an end wall 73 of housing 9. Sleeve 71 contains the outer race 75 of a bearing 77 having an inner race 79 mounted on a collar 81 of a gear 83 splined to shaft 13.

A governor support 85 having an elongated hub portion 87 and an annular radially extending carrier section 89 is splined to the shaft 13 at 91. A spacer 93 separates hub 87 and collar 81, while a shoulder 95 forms a stop or abutment surface adjacent which the carrier is clamped by nut 97. Hub 87 has an annular groove 99 aligned with part of a passage 101 which extends from groove 93 to an end face 103 of carrier 89.

Speed responsive device 5 includes a governor body 105 secured to face 103 by fasteners 107 extending through flanges 108. Body 105 has an axially extending passage 109 covered at one end by a gasket 111 having an opening 113 therein placing passages 101 and 109 in communication with one another.

Body 105 has two cylinders or bores 117 and 119 having valve openings 121 and 123, respectively, placing the cylinders in communication with passage 109. A ball valve 125 is backed with a primary weight 127 and under the influence of centrifugal force on the ball and weight combination, is adapted to seat on valve opening 121 and close the same.

A ball valve 129 backed by a secondary weight 131 urged radially outwardly by a spring 133 is adapted to control the closing of opening 123 under the influence of centrifugal force on the ball, spring and weight and the force exerted by spring 119.

Vents 135 are provided in the wall of body 105 for venting the cylinders 117 and 119. A keeper plate 137 closes the inner ends of the cylinders and is inserted in tracks 139 after the balls, weights and spring have been inserted during assembly of the speed responsive unit.

It will be understood that the mass of weights 127 and 131, balls 125 and 129 and spring 133, as well as spring rate and size of openings 121 and 123 are chosen to provide a desired dual-stage governor pressure-speed curve.

The manner which the aforedescribed device functions as a hydraulic pressure governor is as follows:

When the shaft 13 is stationary, and no fluid is supplied under pressure to the line pressure cavity or passage 37, the parts are generally as shown in FIG. 1 and no fluid under pressure is delivered through line 67 to the speed responsive device 5. Depending upon the rotational location of the device 5, the opening 121 may be open or closed, while spring 133 will hold ball 129 against opening 123. As the shaft 13 begins to rotate and its speed increases, the balls 125 and 129 immediately seat on the openings 121 and 123 to close the same. Line pressure builds up in passage 37 and this pressurized fluid will pass through the orifice 33, which results in a reduction of the pressure, into passage 59 and line 67. It will be understood that fluid is provided in the passage 35 and the left hand end of the bore 17 and groove 25 and its passage or port 29. The ball valves 125 and 129 are held against the openings 121 and 123 by centrifugal force, which centrifugal force is proportional to the square of the speed of the shaft 13. As the line pressure builds up in the passage 37 the pressure in line 67 increases until it reaches a point sufficient to overcome the centrifugal force exerted on the weight 127 and ball 125 to force the same off the seat or opening 121, thus permitting fluid to be vented through the associated vent 135. Ball 129 remains seated on opening 123 during this initial stage of operation. The pressure on the right hand end of the valve member 51 forces the valve member to the left as viewed in FIG. 1. This causes the land 55 to open the communication between the line pressure passage 37 and the port 31, thus allowing the governor pressure in the passage 35 to increase toward the line pressure valve. However, inasmuch as the lands 53, 55 and 57 are of the same cross sectional area, the pressure in passage 35 and the left hand end of the bore 17 will increase only to a point wherein it is equal to the pressure on the right hand end of the valve member, i.e., the pressure in the line 67. As stated previously, the pressure in line 67 is maintained at a value which is proportional to the square of the speed of rotation of the shaft 13. Accordingly, the pressure in the passage 35 is proportional to the square of the speed of rotation of the shaft 13. When such pressure is reached in the passage 35 and begins to slightly exceed such pressure the valve member will move to the right and close off communication between the cavity 37 and the port 31. Thus, the governor pressure is maintained in equalibrium with the pressure in the line 67.

The pressure in line 67 is thus maintained at a value proportional to the square of the speed of the shaft 13 by the primary weight 127 and ball 125. If the pressure in line 67 should exceed a value which is proportional to the square of the speed of the shaft 13, the ball will unseat and allow the fluid to escape and the pressure to be reduced to an appropriate value. The curve of the governor pressure, i.e., the pressure in the passage 35 and in the line 67, is shown as a function of speed in FIG. 3. The curve progresses from point A up to point B as a function of the square of the rotational speed of shaft 13. When the speed of the shaft 13 is at a point which is vertically aligned with the point B on the curve in FIG. 3 a slight increase in the line pressure is insufficient to unseat the ball 125. However, the mass of the ball 129, weight 131, spring 133 and the force of spring 133 are such that the increased pressure will unseat the ball 129, thus permitting fluid to vent from the cylinder 119 through its associated vent 135. The increase in pressure to unseat the ball 129 is less than would be required to unseat the ball 125. Thus, the curve of pressure in the line 67, and hence in the governor pressure in passage 35 and the left hand end of bore 17, follows along the path from point B towards point C on the graph shown in FIG. 3. This pressure increase is less for a corresponding rotational speed increase than in the portion of the curve A -B. At point B the first stage becomes inoperative and the second stage takes over the regulation of the rate of change of pressure.

Figure 3:
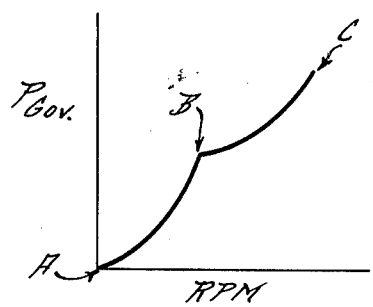
FIG. 3 is a governor pressure-speed curve for the governor shown in FIGS. 1 and 2.

It will thus be seen that this invention provides a hydraulic pressure governor having a first and second stage of operation in which the first stage provides a rapid rate of fluid pressure change up to a predetermined speed noted at point B on the graph in FIG. 3. The second stage of operation provides a slower rate of change of pressure for further increases in speed and is illustrated by the curve B-C on the graph.

When the vehicle decreases in speed the apparatus works in reverse manner to cause the governors pressure vs speed curve to follow backwards along the line from C to B to A. If the line pressure should drop suddenly, the governor pressure in the passage 35 and the left hand end of the bore 17 will cause the valve member 51 to move to the right. When the right hand end of the valve member engages the shoulder at the end of the bore portion 21, the land 55 will place the port 31 in communication with the vent 49 to permit venting of the governor pressure fluid.

It will be seen that the speed responsive device 5 may be readily attached to the carrier 85 and that the relativel simplicity of the speed responsive device 5 lends itself to rapid and economical manufacturing operations.

Although only one embodiment of the invention has been disclosed and described, it is apparent that other embodiments and modifications of the invention are possible.

I claim:

1. Governor apparatus comprising a body adapted to be mounted on one side of a rotatable member mounted in a case, said body having a passage therein adapted to be connected to a source of fluid under pressure, first and second cylinders in said body each having a valve opening placing said passage in communication with the cylinder, a vent from each of said cylinders, movable valve means in said cylinders adapted to control the opening and closing of said valve openings, each of said movable valve means including a ball valve member adapted to close said opening and a weight urging said ball toward a closed position in response to rotation of said rotatable members, relay valve means mounted on said case, said relay valve means including a bore, an inlet to and an outlet from said bore, a transfer port, a transfer line means connecting said transfer port to said passage in said body, a vent from said bore, and a valve member movable in said bore to selectively connect said inlet to said outlet and said outlet to said vent, said valve member having a land therein adapted to meter the flow of fluid from said inlet to said outlet, the valve member having a passage therein placing said inlet in communication with said transfer port, and a restriction in said passage.

2. Governor apparatus for modifying a first hydraulic pressure to a lower second hydraulic pressure related to the rotational speed of a rotatable shaft mounted in a case, comprising relay valve means mounted on the case, a speed responsive means, means mounting said speed responsive means of said shaft, delivery means providing a passage for the delivery of fluid to said valve means, and transfer means providing a passage for the transfer of fluid from the valve means to said speed responsive means, said speed responsive means comprising a body having a primary valve and a secondary valve, both of which are responsive to centrifugal forces and adapted to close and prevent the venting of fluid supplied to said speed responsive means when the rotational speed of said shaft is above, and the pressure of fluid acting thereon is below, predetermined values, each of said primary and secondary valves including a cylinder, an opening in the end of said cylinder a movable ball member adapted to close said opening, and a weight adapted to move said ball member toward a position to close said opening under the influence of centrifugal force, said secondary valve having a spring adapted to urge the associated weight and ball member toward a closed position, said relay valve means including a bore, an inlet to and an outlet from said bore, a transfer port, a transfer line means connecting said transfer port to said body, a vent from said bore, and a valve member movable in said bore to selectively connect said inlet to said outlet and said outlet to said vent, said valve member having a land therein adapted to meter the flow of fluid from said inlet to said outlet, the valve member having a passage therein placing said inlet in communication with said transfer port, and a restriction in said passage.

3. Governor apparatus as set forth in claim 2, wherein said transfer means includes an annular body on said shaft, passages in said annular body, and means for transferring fluid from said relay valve means to said annular body passages.

4. Governor apparatus as set forth in claim 3, wherein said relay valve means includes a stop for preventing movement of said valve member beyond a predetermined point in one direction, said valve member placing said outlet in communication with said vent when in engagement with said stop.

5. Governor apparatus for modifying a first hydraulic pressure to a lower second hydraulic pressure related to the rotational speed of a shaft mounted in a case, comprising relay valve means mounted on the case, a speed responsive device, means mounting said speed responsive device on said shaft, a fluid transfer line connecting said relay valve means to said speed responsive means, said relay valve means having a line pressure fluid inlet, a governor pressure fluid outlet, means for placing said inlet in communication with said transfer line and said governor pressure fluid outlet, said speed responsive means including a body having valve means for controlling the pressure in said transfer line, said valve means comprisng first and second cylinders in said body, a passage in said body in communication with said transfer line, each of said cylinders having an opening at one end thereof placing it in communication with said passage, vents from said cylinders, and closure means in each of said cylinders being biased toward a position wherein the opening in the respective cylinder is closed under the influence of centrifugal force, one of said closure means further including a spring for supplementing centrifugal force, said closure means moving away from said openings when the force exerted thereon by the pressure of fluid in said passage is greater than the forces thereon by centrifugal force and said spring, said means for placing said line pressure fluid inlet in communication with said transfer line and said governor pressure fluid outlet comprising a bore in said relay valve means, a valve member movable in said bore, said valve member having a passage therein placing said inlet in communication with said transfer line, said valve member having a land thereon adapted to place said inlet in controlled communication with said outlet to meter the flow of fluid from the former to the latter, said relay valve means further including a vent connected to said bore, said land being adapted to place said outlet in communication with said vent in said relay valve means when the pressure of fluid in said outlet is greater than the pressure in said inlet.

6. Governor apparatus as set forth in claim 5 wherein said transfer line includes an annular support mounted on said shaft, a sleeve surrounds said support and fixed against rotation, a conduit connecting said relay valve means to said sleeve, said support having a groove therein in communication with said conduit, and a passage connecting said groove with said speed responsive means, said speed responsive means being mounted on said support.

* * * * *